United States Patent

[11] 3,584,232

[72] Inventor Robert L. Wallace, Jr.
Warren Township, Somerset County, N.J.
[21] Appl. No. 792,548
[22] Filed Jan. 21, 1969
[45] Patented June 8, 1971
[73] Assignee Bell Telephone Laboratories Incorporated
Murray Hill, N.J.

[54] PRECISION LOGARITHMIC CONVERTER
9 Claims, 3 Drawing Figs.

[52] U.S. Cl. .......... 307/229, 328/145
[51] Int. Cl. .......... G06g 7/24
[50] Field of Search .......... 328/145; 307/229

[56] References Cited
UNITED STATES PATENTS
3,417,263 12/1968 Thomas .......... 328/145
3,479,593 11/1969 Dissing et al. .......... 328/145

*Primary Examiner*—Stanley D. Miller, Jr.
*Assistant Examiner*—Harold A. Dixon
*Attorneys*—R. J. Guenther and William L. Keefauver

ABSTRACT: Precision logarithmic conversion is achieved by utilizing a serial connection of Schottky barrier diodes in conjunction with an operational amplifier. Deviation from the desired logarithmic characteristic because of diode limitations, namely, reverse-bias saturation current, forward-bias resistance, temperature dependence and the like, is minimized by selectively supplying compensating signals into the input and output circuitry of the amplifier.

INVENTOR
R. L. WALLACE, JR.
BY
C. E. Hirsch
ATTORNEY

PRECISION LOGARITHMIC CONVERTER

This invention relates to logarithmic converters and, more particularly, to precision logarithmic amplifiers.

BACKGROUND OF THE INVENTION

Amplifiers having a logarithmic transfer characteristic are required in many systems. Typically, they are utilized in companders, analog multipliers and dividers, volt meters, and the like.

Logarithmic amplifiers or converters heretofore known in the art have been characterized as lacking precision. This is primarily because of the lack of a circuit element having a true logarithmic voltage-current characteristic. In one attempt to overcome this deficiency transistors have been used to take advantage of their more nearly logarithmic base-emitter voltage-current characteristic. In another attempt, a plurality of diodes of different types, namely, silicon and germanium, have been used in an effort to "match" the characteristic of the diodes to the desired logarithmic characteristic. These attempts, however, have not yielded the high precision logarithmic converters which are needed in many applications.

SUMMARY OF THE INVENTION

These and other problems are resolved in accordance with the inventive principles described herein by selectively compensating for inherent limitations of nonlinear circuit elements to correct for deviation from a "true" logarithmic characteristic. This is achieved by selectively algebraically combining signals in the input and output circuits of a "basic" logarithmic amplifier.

Undesirable deviation from a desired "ideal" logarithmic transfer characteristic has been attributed to unwanted signal components in the output of the amplifier because of inherent limitations of the nonlinear element. Thus, precision logarithmic conversion is achieved in accordance with this invention by selectively algebraically combining signals proportional to selected ones of the unwanted signal components with an applied signal in the input circuit of an amplifier, which includes a nonlinear circuit element, thereby to eliminate substantially the respective unwanted signal components. A partially compensated signal is developed at the output of the amplifier. Further compensation is achieved by selectively algebraically combining signals proportional to others of the unwanted components with the partially compensated signal to eliminate substantially the remaining unwanted signals.

Additionally, errors resulting from amplifier instability are minimized by utilizing a serial connection of a plurality of nonlinear circuit elements to increase the output signal magnitude. Errors introduced because of temperature changes are minimized by controlling the gain of an amplifier, to which the logarithmic signal is supplied, to vary in an inverse relationship to the temperature change.

These and other objects and advantages of the invention will be more fully understood from the following detailed description of an illustrative embodiment thereof taken in connection with the appended drawings.

DETAILED DESCRIPTION

Figure 1:
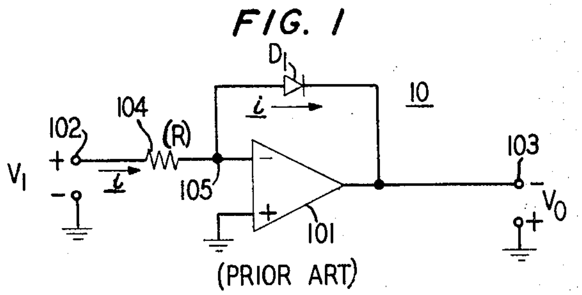
FIG. 1 depicts a basic logarithmic amplifier.

A conventional logarithmic converter 10 is illustrated in FIG. 1. Basically, it comprises an operational amplifier 101, input resistor 104 (R) and diode $D_1$. Assuming $D_1$ to be an ideal diode, i.e., one having a voltage-current characteristic $$i=C \exp V, \qquad (1)$$

application of an input signal $V_1$ to amplifier 101 via input terminal 102 and input resistor 104 yields an output signal $V_o$ at terminal 103 represented by the function $$V_o=\log i/C, \qquad (2)$$

where $i=V_1/R$ and $C$ is a constant. Preferably, amplifier 101 is a high gain, low-drift operational amplifier of a type well known in the art.

In general, physically realizable diodes do not obey the function described by equation (1), i.e., they are not ideal. Indeed, they do not conform to any simple relationship. Recent developments in the diode art, however, have resulted in the production of Schottky barrier diodes which have a voltage-current characteristic which may be expressed as $$i=i_0\left[\exp \frac{q}{nkT}(V-R_0 i)-1\right] \qquad (3)$$

where $$i_0=AT^2 \exp -\frac{q\varphi}{nkT} \qquad (4)$$

and in which:

$i_o$ represents reverse-bias saturation current in amperes,
$R_o$ represents the forward-bias series resistance in ohms,
$k$ represents Boltzman's constant,
$T$ represents temperature in degrees Kelvin,
$q$ represents the charge of an electron in coulombs,
$A$ represents a constant proportional to diode area (120 Amps./cm.$^2$),
$n$ represents a constant of approximately 1 (1.02), and
$\Phi$ represents terminal contact potential in volts.

Diodes having characteristics which conform to equation (3) are described in greater detail by M. P. Lepselter and S. N. Sze in an article entitled "Silicon Schottky Barrier Diode with Near-Ideal I–V Characteristics," in the *Bell Telephone Technical Journal*, Feb. 1968.

Rewriting equation (3) as $$V=R_0 i+\frac{nkT}{q}[\log (i+i_0)-\log i_0] \qquad (5)$$

it is apparent that the Lepselter-Sze diode approximates the desired ideal exponential or logarithmic behavior. Deviation from the ideal logarithmic voltage-current characteristic, however, occurs because of inherent limitations in the diode, namely, reverse-bias saturation current, forward-bias resistance and temperature dependence. Typically, diode voltage $V$ deviates from the desired ideal logarithmic behavior when diode current $i$ is at low magnitudes because of reverse-bias saturation current $i_o$, and when $i$ is at high magnitudes because of forward-bias resistance $R_o$.

Figure 2:
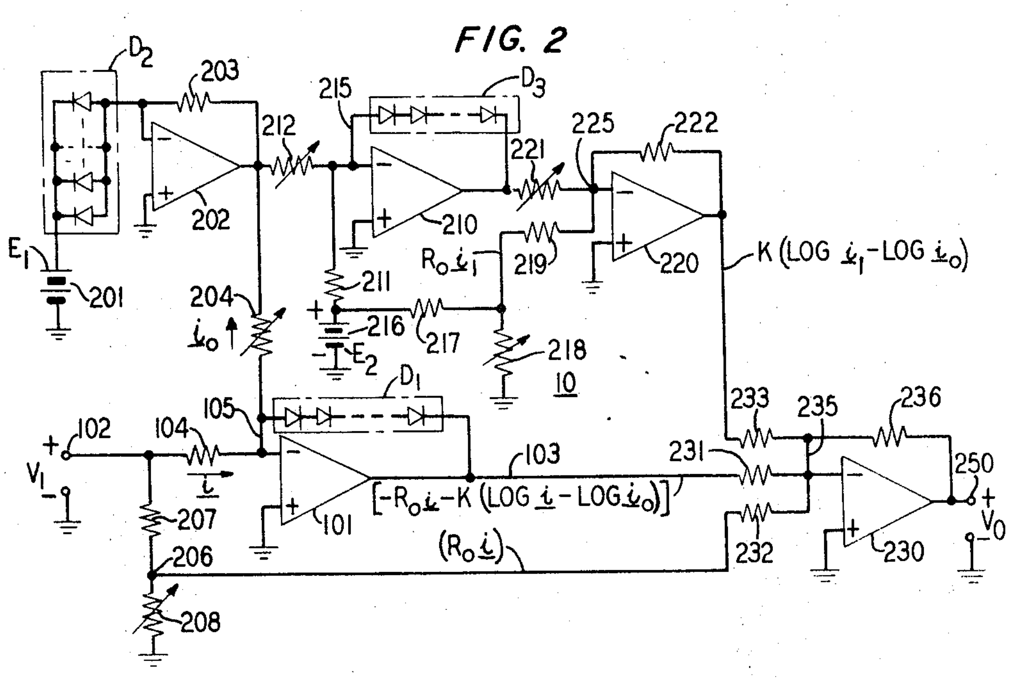
(PRIOR ART) FIG. 2
FIG. 2 shows a circuit diagram of a precision logarithmic amplifier illustrating the invention.

FIG. 2 depicts an improved logarithmic converter, in accordance with the principles of this invention, which overcomes the inherent limitations of realizable diodes and, in addition, has other advantages. Input signal $V_1$ is applied to amplifier 101, via terminal 102 and resistor 104, to develop current $i$ at summing point 105. If current $i$ alone was applied to amplifier 101, a signal developed across diode $D_1$, and consequently at point 103, would represent the function expressed in equation (5). A signal so developed includes undesirable signal components, as noted above, which cause deviation from the desired logarithmic function.

Selected signals in accordance with the invention are supplied to the input and output circuits of logarithmic amplifier 10 to eliminate substantially the undesirable signal components. Accordingly, a signal representative of $-i_o$ is additionally applied to amplifier 101 at summing point 105. Since the current applied to diode $D_1$ is therefore $(i-i_o)$, the signal developed across $D_1$ may be expressed as $$V=R_o (i-i_o)+K [\log i-\log i_o], \qquad (6)$$

where $$K=nkT/q.$$

This signal modification, i.e., subtracting $i_o$ from the input current $i$, extends the lower limit of the logarithmic response of the amplifier.

Current $i_o$ is generated by reverse-biasing a diode; preferably it is generated by supplying potential $E$ from source 201 to diode $D_2$. Diode $D_2$ is selected to be reasonably similar to diode $D_1$, so that the reverse-bias saturation currents are substantially the same. Thus, the reverse-bias saturation current developed in $D_2$ is applied to amplifier 202 and an appropriate signal is developed across resistor 203. In practice, however, the reverse-bias saturation currents of diodes $D_1$ and $D_2$ may not match exactly. Therefore, the resistance value of resistor 204 may be adjusted to compensate for any such differences. Drift and stability requirements of amplifier 202 may be somewhat relaxed provided the reverse-bias saturation current $i_o$ of diode $D_2$ is increased in magnitude. This is achieved by utilizing a number of diodes similar to $D_1$ in a parallel connection.

Two undesirable signal components still remain in equation (6), namely, $K \log i_o$ and $R_o (i-i_o)$. Because the influence of forward-bias resistance $R_o$ is significant only at magnitudes of diode current $i$ very much greater than $i_o$, $i_o$ may be neglected in regard to the forward-bias resistance term. Thus, a signal representative of $R_o i$ is developed at point 206 by supplying input signal $V_1$ to resistors 207 and 208. The value of resistor 208 may be adjusted to develop the required signal value.

The $K \log i_o$ term of equation (6) is compensated by first developing a signal representative of $K (\log i_1 - \log i_o)$. This is achieved by applying current $i_1$ and current $-i_o$ to amplifier 210 at point 215, and hence to diode $D_3$. Current $i_1$ is developed by supplying potential $E_2$ from source 216 to resistor 211, and current $i_o$ is developed by amplifier 202 as previously described. Since the reverse-bias saturation currents of diodes $D_2$ and $D_3$ may differ, the magnitude of current $i_o$ applied to amplifier 210 is varied by adjustment of the resistance value of resistor 212 to obtain a suitable match. The signal developed across $D_3$, namely, $R_o i_1 - K (\log i_1 - \log i_o)$, is supplied to amplifier 220 where it is inverted and amplified in well-known fashion. The gain of amplifier 220 is adjusted for "trimming up" the signal to compensate for differences between diodes $D_1$ and $D_3$ as desired via adjustment of resistor 221. The influence of forward-bias resistance $R_o$ of diode $D_3$ is compensated by supplying potential $E_2$ via source 216 and resistor 217 to adjustable resistor 218, thus to develop a signal proportional to $R_o i_1$. Signal $R_o i_1$ is supplied to amplifier 220, via resistor 219, where it is algebraically combined with the signal developed across diode $D_3$ at summing point 225. Accordingly, a signal is developed across resistor 222 which is representative of $K (\log i_1 - \log i_o)$.

Thus, signals representative of $-R_o i - K (\log i_1 - \log i_o)$, $R_o i$, and $K (\log i_1 - \log i_o)$ are supplied to amplifier 230 via resistors 231, 232, and 233, respectively. These signals are selectively algebraically summed at point 235. The "summed" signal is applied to resistor 236 across which a signal is developed representative of $$V_o = \log i/i_1, \qquad (7)$$

where $$K = nkT/q.$$

Since $i_1$ is a constant, a signal developed at output terminal 250 essentially represents the ideal logarithmic function described in equation (1), namely, $$V_o = \log i/C. \qquad (8)$$

Because the "constant" $K$, which is $nkT/q$, and $i_o$ are highly temperature dependent, precautions must be taken to minimize errors which might result from temperature variation. This may be partially accomplished by manufacturing the diodes $D_1$, $D_2$ and $D_3$ on a single silicon substrate by use of integrated circuit techniques. Such construction maintains the diodes at essentially the same temperature and additionally ensures fairly similar diode characteristics. Additional compensation, however, is required for high precision.

The output signal developed by the amplifier of FIG. 2, as expressed in equation (7), varies in magnitude in direct proportion to temperature. Typically, the output signal magnitude varies approximately 0.36 percent per degree centigrade. This variation may be minimized obviously by maintaining the environmental temperature constant, for example, by utilizing an oven or the like. Such apparatus, however, occupies much space and requires ancillary equipment. Therefore, use of ovens and the like is undesirable. Temperature compensation which yields high precision signals is effected electronically in accordance with the invention.

Figure 3:
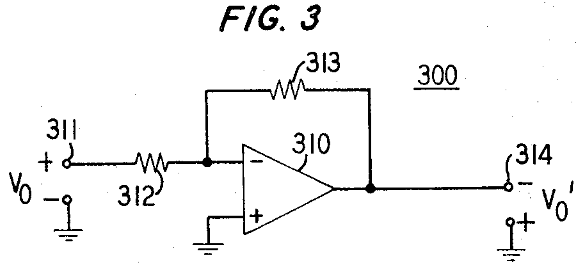
FIG. 3 illustrates a temperature sensitive variable gain amplifier which may be utilized in conjunction with the logarithmic amplifier of FIG. 2.

FIG. 3 depicts an amplifier 300 which is useful in further compensating for variations caused in the output signal of the amplifier of FIG. 2 by temperature changes. Output signal $V_o$ developed by the amplifier of FIG. 2 is supplied to operational amplifier 310 via terminal 311 and resistor 312. Gain of amplifier 300 is "set," in well-known fashion, by the ratio of the resistance values of resistors 313 and 312, namely, $$\text{Gain} = R313/R312. \qquad (9)$$

Since $V_o$ varies directly with temperature, a compensating network having a negative temperature coefficient is required. This requirement is satisfied by utilizing a resistive material for resistor 312 which varies in resistance value directly with temperature. For example, both copper and platinum have temperature coefficients which are only slightly greater than required. An exact coefficient is attained by making resistor 312 partly of copper or platinum and partly of a low temperature coefficient material. In practice, a resistor comprising approximately 85 percent copper and 15 percent of the material known commercially as "Evanohm" is satisfactory. Thus, by utilizing such a resistor, the gain of amplifier 300, as expressed in equation (9), varies inversely as temperature, thereby compensating for temperature variations in signals developed by the logarithmic amplifier of FIG. 2. Amplifier 300 can be eliminated by controlling the gain of amplifier 231 of FIG. 2. For high precision, use of amplifier 300 is preferred.

In practice, it has been found that errors occur if the operational amplifier characteristics vary. For a typical Lepselter-Sze diode the diode voltage change is approximately 3 millivolts per 1 db. change in diode current. Typically, operational amplifiers may have a DC output drift in the order of 2 millivolts while very expensive amplifiers are available having drifts of approximately 0.1 millivolts. The drift of the amplifier used limits the accuracy of a logarithmic converter utilizing a single diode. This limitation is overcome in accordance with the invention by using a plurality of diodes for each of diodes $D_1$, $D_2$ and $D_3$ of the amplifier of FIG. 2. For example, a serial connection of diodes is utilized for $D_1$ and $D_3$ and a parallel connection is used for $D_2$ to minimize errors resulting from amplifier instability. This is readily accomplished by use of integrated circuitry.

Since in a single diode the rate of change of diode voltage is 3 millivolts per db. of current, the number of diodes serially connected for each of $D_1$ and $D_3$, which are required for optimum operation is expressed by $$d = V/3(10^{13})\,N \qquad (10)$$

where $d$ is the number of diodes, $V$ is the maximum output voltage of the operational amplifier, and $N$ is the current range in db. to be traversed. As a practical matter, the amplifier should not be driven into saturation, therefore an amplifier voltage somewhat less than the maximum value should be used. Thus equation (10) reduces to $$d = 300\,V/N. \qquad (11)$$

Utilization of a serial connection of diodes has advantages other than minimization of drift errors and allowing the use of less expensive operational amplifiers. For example, as the number of diodes increases, the $nkT/q \log i_o$ term of equation (6) becomes a smaller part of output signal $V_o$ and hence the accuracy with which this term can be eliminated by compensation increases.

What I claim is:

1. A logarithmic converter which comprises:

first amplifier means having an input and an output;

first nonlinear semiconductor means in circuit with said first amplifier means for establishing a logarithmic transfer characteristic;

means for supplying a first signal as a first input to said first amplifier means;

means for developing a second signal having an amplitude proportional to the amplitude of said first signal;
second nonlinear semiconductor means;
means for reverse biasing said second nonlinear semiconductor means to generate a third signal;
means for selectively supplying said third signal as a second input to said first amplifier means;
second amplifier means;
third nonlinear semiconductor means in circuit with said second amplifier means for establishing a logarithmic transfer characteristic;
means for supplying a fourth signal having a predetermined amplitude as a first input to said second amplifier means;
means for selectively supplying said third signal as a second input to said second amplifier means;
means for generating a fifth signal having an amplitude proportional to the amplitude of said fourth signal;
first means for selectively algebraically combining said fifth signal with a signal developed at the output of said second amplifier means; and
second means for selectively algebraically combining said first combined signal, a signal developed at the output of said first amplifier means and said second signal.

2. A logarithmic converter as defined in claim 1 wherein each of said first, second and third nonlinear semiconductor means includes at least one semiconductor diode.

3. A logarithmic converter as defined in claim 1 further including third amplifier means in circuit with said second nonlinear semiconductor means and wherein said means for supplying said third signal to the input of said first amplifier means includes means for adjusting the amplitude of said third signal.

4. A circuit as defined in claim 1 wherein said first nonlinear semiconductor means includes a plurality of diodes connected in series,
said second nonlinear semiconductor means includes a plurality of diodes connected in parallel, and
said third nonlinear semiconductor means includes a plurality of diodes connected in series.

5. Apparatus as defined in claim 1 further including amplifier means having a gain characteristic which varies in a predetermined inverse relationship with changes in temperature, said means being responsive to compensate signals developed by said summing amplifier for variations because of temperature change.

6. Apparatus as defined in claim 1 wherein each of said first and second combining means includes a summing amplifier.

7. Apparatus as defined in claim 6 wherein the summing amplifier of said second combining means has a gain characteristic which varies in a predetermined inverse relationship with temperature variation.

8. A logarithmic conversion circuit which comprises, in combination:
a first amplifier having an input, an output and a feedback circuit;
a first plurality of diodes connected in series in the feedback circuit of said first amplifier;
means for supplying a signal as a first input to said first amplifier;
a second amplifier having an input, an output and a feedback circuit;
a second plurality of diodes connected in parallel in the input of said second amplifier;
means for reverse biasing said second plurality of diodes;
means in circuit relationship with said second amplifier for adjusting the amplitude of signals developed at the output of said second amplifier;
means for applying said adjusted signals developed by said second amplifier as a second input to said first amplifier;
a third amplifier having an input, an output and a feedback circuit;
a third plurality of diodes serially connected in the feedback circuit of said third amplifier;
means for applying a signal having a fixed magnitude as a first input to said third amplifier;
means for applying signals developed by said second amplifier as a second input to said third amplifier;
means in circuit relationship with said third amplifier for adjusting the amplitude of a signal developed at the output of said third amplifier;
means for developing a signal proportional to said signal supplied as said first input to said first amplifier; and
means for selectively algebraically summing said signal proportional to said first input signal, said signal developed at the output of said first amplifier, and said signal developed at the output of said third amplifier.

9. A circuit as defined in claim 8 wherein said summing means has a gain characteristic which varies in an inverse relationship with temperature.